(12) United States Patent
Harris

(10) Patent No.: US 8,824,131 B2
(45) Date of Patent: Sep. 2, 2014

(54) DISK DRIVE MOUNTING ASSEMBLY

(75) Inventor: Nesdon Harris, Chantilly, VA (US)

(73) Assignee: Germane Systems, LLC, Chantilly, VA (US)

( * ) Notice: Subject to any disclaimer, the term of this patent is extended or adjusted under 35 U.S.C. 154(b) by 363 days.

(21) Appl. No.: 13/078,270

(22) Filed: Apr. 1, 2011

(65) Prior Publication Data

US 2012/0250243 A1   Oct. 4, 2012

(51) Int. Cl.
*H05K 13/04* (2006.01)
*G06F 1/18* (2006.01)

(52) U.S. Cl.
CPC ...................... *G06F 1/187* (2013.01)
USPC ............... 361/679.33; 361/679.02; 312/223.1

(58) Field of Classification Search
CPC ............ G06F 1/187; G06F 1/181; H05K 5/02
USPC ............. 361/679.01, 679.02, 679.31–679.39; 312/1–223
See application file for complete search history.

(56) References Cited

U.S. PATENT DOCUMENTS

| | | | |
|---|---|---|---|
| 4,734,851 A | 3/1988 | Director | |
| 4,819,114 A * | 4/1989 | Bernitt et al. | 360/133 |
| 5,077,722 A * | 12/1991 | Geist et al. | 720/657 |
| 5,280,398 A * | 1/1994 | Wade et al. | 360/60 |
| 6,088,221 A * | 7/2000 | Bolognia | 361/679.37 |
| 6,351,375 B1 | 2/2002 | Hsieh et al. | |
| 6,366,455 B1 * | 4/2002 | Diaz et al. | 361/679.4 |
| 6,388,873 B1 | 5/2002 | Brooks et al. | |
| 6,856,508 B2 | 2/2005 | Rabinovitz | |
| 6,970,352 B2 | 11/2005 | Record et al. | |
| 7,027,298 B2 | 4/2006 | Wu et al. | |
| 7,180,732 B2 | 2/2007 | Meehan et al. | |
| 7,457,081 B2 * | 11/2008 | Oishi | 360/133 |
| 8,085,501 B2 * | 12/2011 | Martin | 360/133 |
| 2004/0054840 A1 * | 3/2004 | Berg et al. | 710/306 |
| 2004/0070922 A1 * | 4/2004 | Erskine | 361/601 |
| 2009/0052296 A1 | 2/2009 | Tracy et al. | |
| 2009/0161308 A1 | 6/2009 | Chen et al. | |

\* cited by examiner

*Primary Examiner* — Anthony Haughton
*Assistant Examiner* — Ingrid Wright
(74) *Attorney, Agent, or Firm* — Nixon & Vanderhye P.C.

(57) ABSTRACT

A disk drive mount assembly for a removable disk drive includes a write protect switch located on a front of the disk drive mount assembly. The write protect switch is electrically coupled to the disk drive so that moving the switch between a write protect position and a write enable position allows one to change the write protect mode of the disk drive. A mechanism for holding the write protect switch in either the write protect position or the write enable position may also be provided on the disk drive mount assembly to prevent the switch from being accidentally moved between these two positions due to shock, vibration or accidental contact.

20 Claims, 6 Drawing Sheets

DISK DRIVE MOUNTING ASSEMBLY

BACKGROUND OF THE INVENTION

Many computers and computer servers are designed to receive removable disk drives. Typically, a front face of the computer or computer server will have one or more apertures which allow disk drives to be inserted into and removed from the computer.

In a typical configuration, a mounting assembly located inside the computer or computer server is designed to receive the removable disk drives. The mounting assembly will include a backplane with a plurality of connectors. Corresponding connectors located on the rear face of the disk drives are designed to engage the connectors on the backplane of the mounting assembly. When a disk drive is inserted into the mounting assembly, the connectors on the rear face of the disk drive engage and connect to the connectors on the backplane of the mounting assembly. The connectors provide power and data connections between the computer and the disk drive.

Many disk drives are capable of being switched into a "read only" or "write protect" mode, in which data can only be read from the disk drive. It is sometimes desirable to switch a disk drive into the write protect mode to ensure that the data stored on the disk drive is not written over or deleted.

Many disk drives include a plurality of jumper pins located on the rear face of the disk drive. One can place a jumper on two of the jumper pins to electrically connect the two jumper pins. And by electrically connecting two jumper pins, one can custom configure the disk drive in various ways. Often, disk drives will allow a user to electrically connect two jumper pins to switch the disk drive into a write protect mode. If the two jumper pins are not electrically connected, the disk drive will be in a write enable mode, where one can delete information from the drive, or write new data to the drive.

Because the jumper pins are typically located on the rear face of a disk drive, in order to change between the write protect mode and the write enable mode, it is usually necessary to remove the disk drive from a computer or computer server in order to make the change. At a minimum, one must gain access to the rear of the disk drive in order to mount a jumper on the jumper pins or to remove a jumper from the jumper pins.

DETAILED DESCRIPTION OF PREFERRED EMBODIMENTS

Figure 1A:
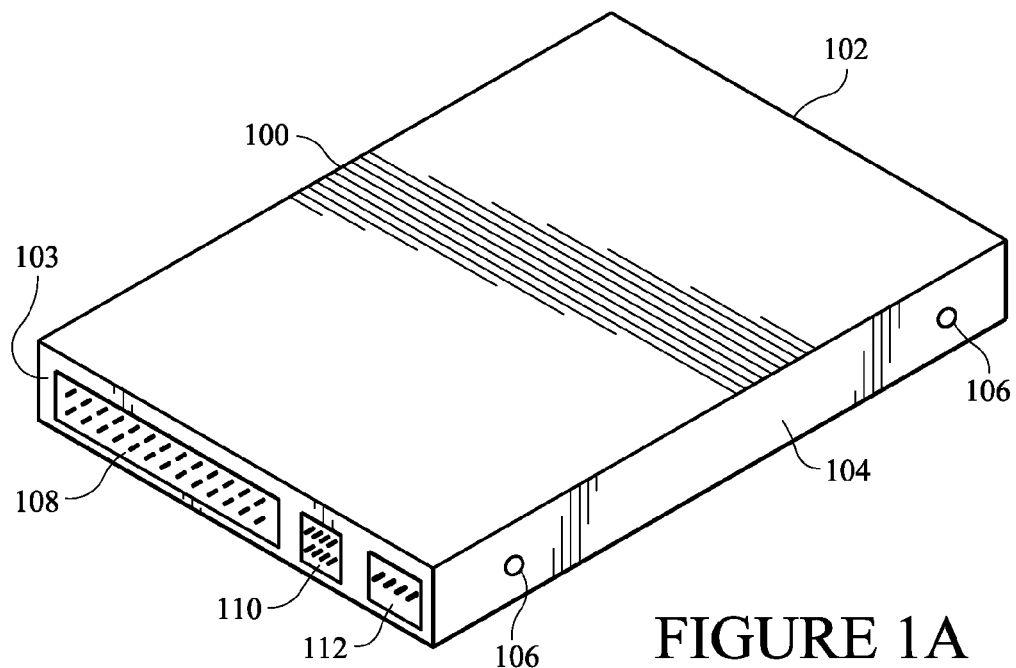
FIG. 1A is a rear perspective view of a disk drive.

A typical removable disk drive for a computer or computer server is illustrated in FIG. 1A. As shown in FIG. 1A, the disk drive 100 has a front face 102, a rear face 103, and side walls 104. One or more screw holes 106 that facilitate mounting of the disk drive may be located on the side walls 104. Similar mounting screw holes may also be located on the top or bottom surfaces of the disk drive.

Figure 1B:
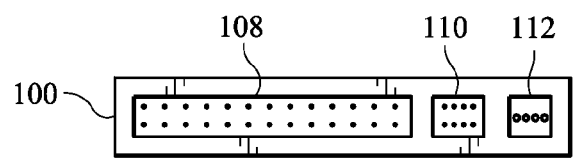
FIG. 1B is a rear elevation view of the disk drive illustrated in FIG. 1A.

A plurality of connectors are located on the rear face 103 disk drive 100. A data connector 108 includes a plurality of pins which extend rearward. In addition, a plurality of jumper pins 110 may be located on the rear face 103. Further, a power connector 112 can also include a plurality of pins. FIG. 1B shows a rear elevation view of the disk drive illustrating the data connector 108, the jumper pins 110 and the power connector 112.

Figure 2:
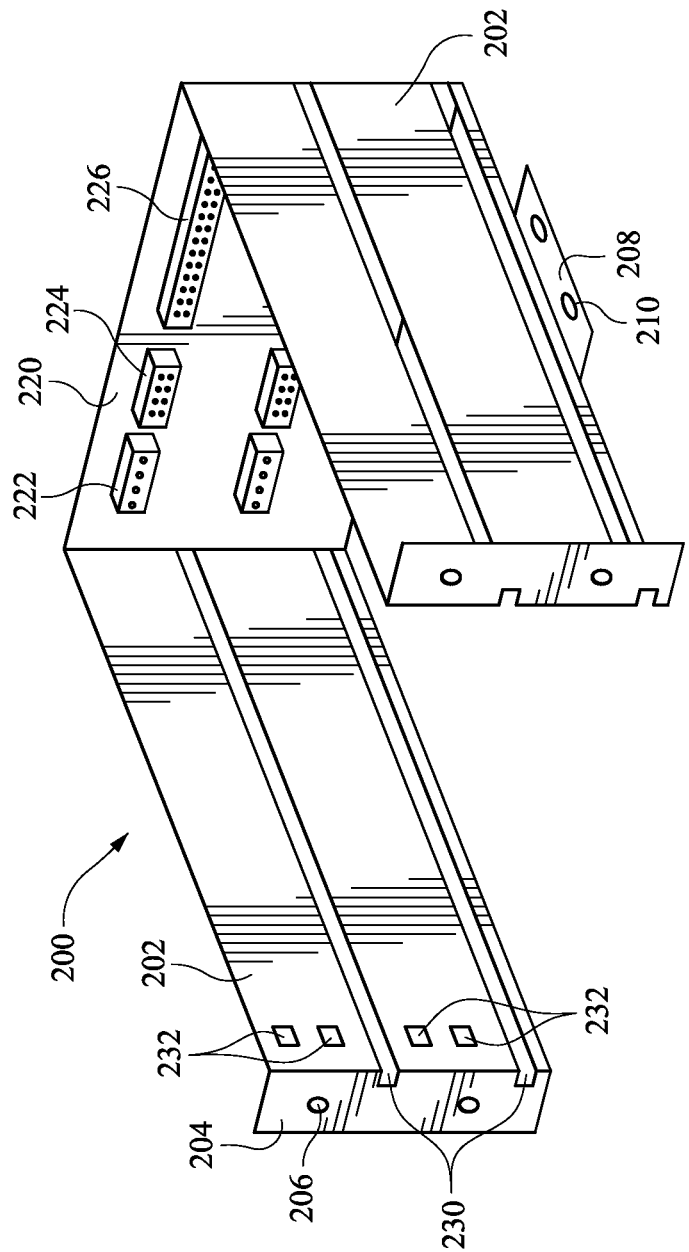
FIG. 2 is a perspective view of a mounting assembly which is designed to receive removable disk drives.

FIG. 2 illustrates a typical mounting assembly which would be located inside of a computer or a computer server. The mounting assembly 200 is designed to receive two or more removable disk drives.

The mounting assembly 200 includes side walls 202 and a backplane 220. Flanges 204 with screw holes 206 to facilitate mounting the assembly inside a computer or server enclosure are located at the forward ends of the side walls 202. Side flanges 208 with screw holes 210 are also provided on the side walls 202.

A plurality of connectors are located on the backplane 220. The connectors can include a power connector 222, a jumper pin connector 224, and a data connector 226. In some embodiments, there would be no jumper pin connector 224 on the backplane 220. Various cables would attach connectors 222, 224, 226 on the backplane 220 to the relevant circuits and power supply of the computer or server. When a disk drive is slid into the mounting assembly 200, the connectors on the rear face of the disk drive are plugged into the connectors 222, 224, 226 on the backplane 220 to electrically connect the disk drive to the computer or computer server.

Figure 3A:
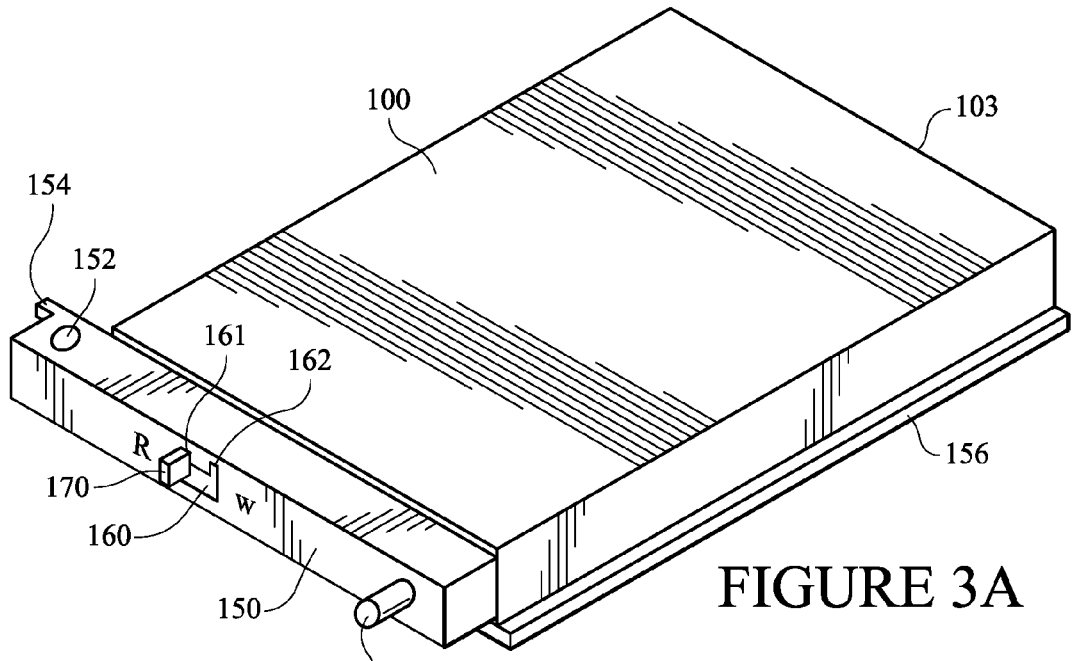
FIG. 3A is a perspective view of a disk drive attached to a disk drive mount.

FIG. 3 illustrates a first embodiment of a disk drive mount assembly attached to a disk drive 100. As shown in FIG. 3A, a plate on the mounting assembly is attached to the bottom surface of the disk drive 100. The plate extends outward from the sides of the disk drive to form mounting rails 156.

Figure 3B:
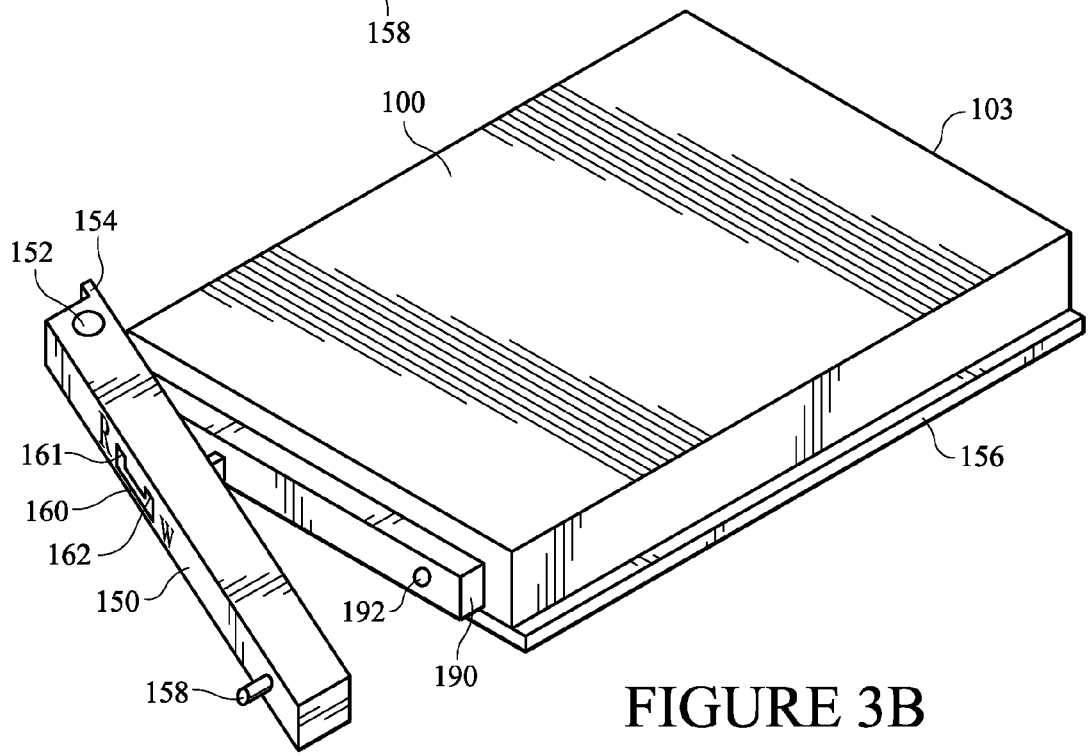
FIG. 3B is a perspective view of a disk drive attached to a disk drive mount with a cover plate partially opened.
Figure 4:
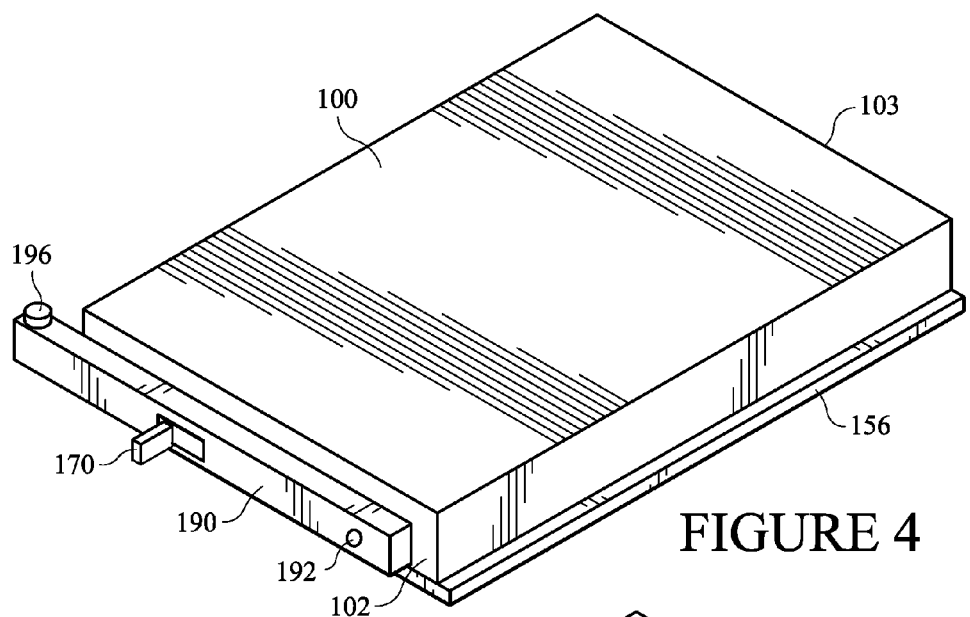
FIG. 4 is perspective view of a disk drive attached to a disk drive mount where the cover plate has been removed.

The disk drive mount also includes a front face portion 190, as illustrated in FIG. 3B. The front face portion 190 is attached to and extends upward from the front of the plate that is attached to the bottom of the disk drive 100. When the disk drive 100 is mounted on the plate, the front face portion 190 is adjacent to the front face of the disk drive 100.

A cover plate 150 is pivotally attached to the front face portion 190. A pivot axis 152 is located on a first end of the front face portion 190 and the cover plate 150. In FIG. 3A, the cover plate is located in a closed position. In FIG. 3B, the cover plate has been pivoted to a partially open position.

As illustrated in FIG. 3B, a screw hole 192 is located on a second end of the front face portion 190. In addition, a securing screw 158 is located on the second end of the cover plate 150. When the cover plate 150 is pivoted into the closed position, as illustrated in FIG. 3A, the securing screw 158 can be screwed into the screw hole 192 of the front face portion 190 to hold the cover plate in the closed position.

The cover plate 150 also includes one or more securing tabs 154 located at the first end of the cover plate 150 near the pivot axis 152. When the cover plate is pivoted into the open position, the securing tabs are brought adjacent to the side wall of the disk drive 100. When the cover plate is pivoted into the closed position, as illustrated in FIG. 3A, the securing tabs extend outward away from the side wall of the disk drive 100.

The disk drive with the attached disk drive mounts are configured to be slid into the mounting assembly illustrated in FIG. 2. The side rails 156 are inserted into mounting slots 230 formed on the side walls 202 of the mounting assembly 200. The side rails 156 hold the mount assembly and the attached disk drive 100 at the appropriate position so that as the disk drive is slid back along the mounting slots 230, the connectors 108, 110, 112 on the rear of the disk drive 100 slide into engagement the corresponding connectors 222, 224, 226 on the backplane 220.

The mount assembly is configured so that the disk drive and the attached disk drive mount are to be slid into the mount assembly 200 with the cover plate 150 pivoted into the open position. Once the disk drive has been fully inserted into the mounting assembly, and the connectors on the rear of the disk drive have been engaged with the corresponding connectors on the backplane 220, the cover plate 150 is pivoted into the closed position, as illustrated in FIG. 3A. As a result, the securing tabs 154 on the cover plate 150 pivot outward, away from the side wall of the disk drive, and into engagement with corresponding securing apertures 232 on the side wall 202 of the mount assembly 200. Once the securing screw 158 on the cover plate 150 has been screwed into the screw hole 192 of the front face portion 190 of the mount assembly, the cover plate can no longer pivot into the open position. As a result, the securing tabs 154 on the cover plate are held in the securing apertures 232 of the mounting assembly so that the disk drive is held on the mounting assembly.

As also illustrated in FIGS. 3A and 3B, a write protect switch with a switch actuator 170 is located on the front face portion 190 of the disk drive mount. The switch actuator 170 protrudes through a switch actuator slot 160 on the cover plate 150 when the cover plate is closed. The switch actuator 170 can be moved between a write enable position and a write protect position.

The write protect switch on the disk drive mount is electrically coupled to two jumper pins on the rear of disk drive that control whether the disk drive is in a write protect mode or a write enable mode. As explained above, most disk drives are configured such that when two such jumper pins are electrically connected, the disk drive is in a write protect mode. When the two jumper pins are not electrically connected, the disk drive is in a write enable mode.

In the embodiment illustrated in FIGS. 3A and 3B, the write protect switch is coupled to the two jumper pins of a disk drive that control the write protect/write enable mode. The write protect switch can be coupled to the jumper pins of a disk drive in many different ways. In some embodiments, wiring will extend from the write protect switch to the jumper pins located at the rear of the disk drive. The wiring could be ribbon cable that extends down the top, bottom or sides of the disk drive and its mounting hardware. Such ribbon cable could include an adhesive layer that is used to attach the ribbon wire to selected portions of the disk drive or its mounting hardware.

When the switch is in a write enable mode, the switch de-couples the two jumper pins. When the switch is in a write protect mode, the switch electrically couples the two jumper pins. Thus, one is able to switch the disk drive between the write protect mode and the write enable mode using the write protect switch on the front of the disk drive mount. With a disk drive mount as described, there is no need to access the rear of the disk drive or to remove the disk drive in order to change the disk drive from one mode to the other.

As illustrated in FIGS. 3A and 3B, the switch actuator slot 160 on the cover plate includes first and second detent positions 161, 162. In this embodiment, the switch actuator 170 is biased upward. As a result, when the switch actuator 170 is located at a first end of the switch actuator slot 160, it will be biased upward into the first detent position 161, which corresponds to a write protect or "read only" position.

Because the switch actuator 170 is biased upward, the first detent position 161 in the slot 160 prevents the switch actuator 170 from being accidentally moved out of that first detent position 161. However, an operator will be able to push the switch actuator 170 downward against the biasing force to allow the switch actuator 170 to be moved to the second end of the switch actuator slot 160 and into the second detent position 162. The second detent position 162 corresponds to a "write enable" position. Once the operator releases the switch actuator, the biasing force will push the switch actuator 170 upward into the second detent position 162. Here again, the biasing force will ensure that the switch actuator 170 remains in the second detent position 162 unless the operator deliberately moves the switch actuator 170 out of this position.

The detent positions 161, 162 in the switch actuator slot 160 ensure that the write protect switch will remain in whatever position the operator chooses and that any shock, vibration or accidental contact with the switch actuator 170 will not cause the switch actuator 170 to move to a different position.

Figure 5:
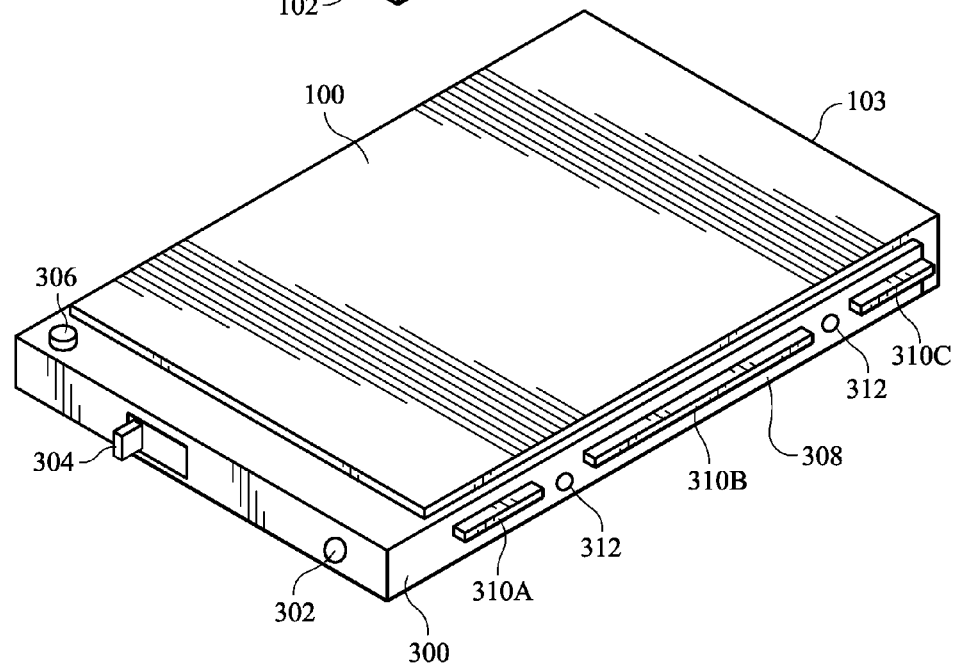
FIG. 5 is a perspective view of a disk drive attached to a second embodiment of a disk drive mount.

FIG. 5 illustrates an alternate embodiment of the disk drive mount. In this embodiment, rather than having a plate attached to the bottom of the disk drive, the disk drive mount 300 includes side arms 308 which are attached to the sides of the disk drive 100 by one or more mounting screws 312. In addition, mounting rails 310a, 310b, 310c extend outward from the side arms 308. Here again, the mounting rails 310a, 310b, 310c are designed to be slid into corresponding mounting slots 230 on a mounting assembly 200.

The front face portion of the disk drive mount 300 also includes a screw hole 302 which is designed to receive a securing screw on a cover plate. Further, a pivot axis 306 is located at the end of the front face portion of the disk drive mount to allow a cover plate to be pivotally mounted thereon. Also, a switch actuator 304 protrudes from the front face of the disk drive mount. When a cover plate is pivotally mounted on the front face portion of a disk drive mount, the switch actuator 304 would protrude through an aperture in the cover plate, as explained above with reference to the embodiment illustrated in FIGS. 3A and 3B.

In the embodiments described above, the switch actuator slot 160 in the cover plate 150 has a generally U-shaped slot which includes two detent positions 161, 162 at opposite ends of the slot. In that embodiment, the switch actuator 170 is biased upwards so that it engages either the first detent position 161 corresponding to the write protect mode or the second detent position 162 corresponding to the write enable mode.

Figure 6A:
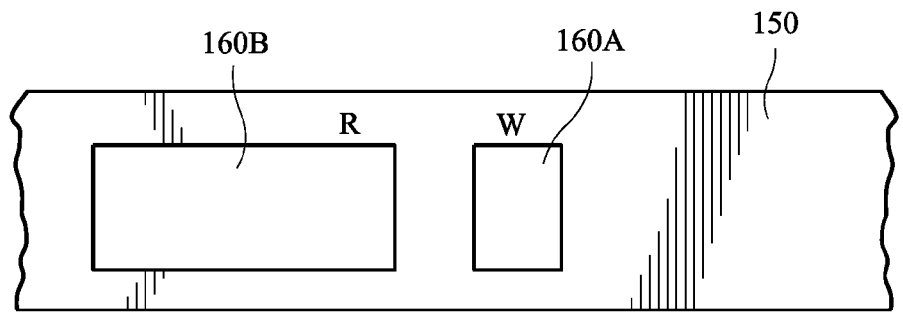
FIG. 6A illustrates a portion of the front face of a cover plate of a disk drive mount.
Figure 6B:
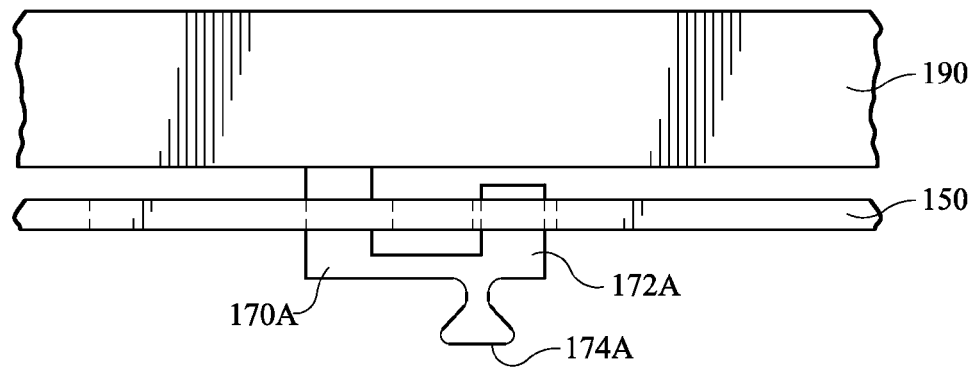
FIG. 6B is a top view illustrating how a switch actuator extending from a disk drive mount engages apertures located in a cover plate of a disk drive mount when in a first position.
Figure 6C:
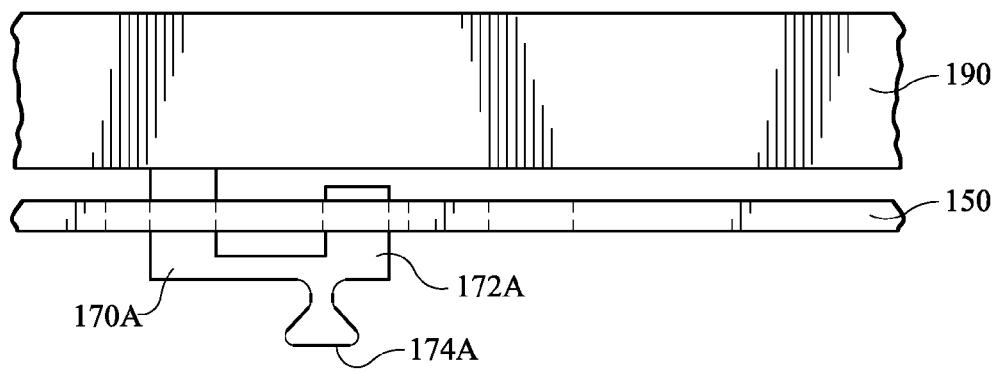
FIG. 6C is a top view similar to FIG. 6B, with the switch actuator located in a second different position.

FIGS. 6A-C illustrate an alternate embodiment of the cover plate and switch actuator mechanism. In this embodiment, the switch actuator must be pulled outward away from the front face of the disk drive mount assembly in order to move the write protect switch between a write enable position and a write protect position.

FIG. 6A illustrates a portion of the front face of cover plate 150 of the disk drive mount. This portion of the cover plate 150 includes a write enable position aperture 160A and a write protect position aperture 160B.

FIG. 6B is a top view illustrating how the switch actuator 170A protrudes from a front face of the front face portion 190 of a disk drive mount assembly. As shown in FIG. 6B, the switch actuator 170A is C-shaped and includes a switch actuator protrusion 172A. A grasping portion 174A protrudes from the front face of the switch actuator 170A.

When the switch actuator 170A is in a write enable position, the switch actuator protrusion 172A is received in the write enable position aperture 160A of the cover plate 150, as illustrated in FIG. 6A. In order to move the switch actuator 170A to a write protect position, an operator must grasp the grasping portion 174A, and pull the switch actuator protrusion 172A out of the write enable position aperture 160A, and then move the entire switch actuator to the left and into the position illustrated in FIG. 6C. As shown in FIG. 6C, when the switch is in the write protect position, the switch actuator 170A is located entirely within the write protect position aperture 160B illustrated in FIG. 6A.

The switch actuator 170A may be sufficiently flexible to allow it to be pulled outward so that it can move between the write protect and write enable positions. Alternatively, or in addition, the switch actuator 170A may be biased towards the rear of the disk drive. In this instance, the operator could pull the switch actuator 170A outward to move the switch between the write protect and write enable positions, and when the operator releases the switch actuator 170A, the biasing force will pull the switch actuator inward so that the switch actuator protrusion 172A is drawn into either the write enable position aperture 160A or the write protect position aperture 160B.

A switch actuator assembly as illustrated in FIGS. 6A-6C prevents any accidental contact which pushes the switch actuator inward from causing the switch to move between positions. In order to move the switch between positions, it is necessary for an operator to pull the switch actuator outward away from the front face of the disk drive assembly. As a result, this type of an actuator mechanism can be even more secure than the one illustrated in FIGS. 3A and 3B, because most accidental contact with the switch actuator would push the switch actuator inward, not pull it outward away from the disk drive.

In addition, as illustrated in FIGS. 3A and 3B, the cover plate 150 must be pivoted away from the front face of the disk drive in order to remove the disk drive from the mounting assembly. With a write protect mechanism as illustrated in FIGS. 6A-6C, it is necessary to move the switch actuator 170 into the write protect position illustrated in FIG. 6C before it is possible to pivot the cover plate 150 from the closed position to the open position. This will ensure that each time a disk drive is removed from the mounting assembly of a computer or a computer server, the disk drive will be placed into the write protect mode. Likewise, when the disk drive is inserted into a mounting assembly of a computer or computer server, before it is possible to pivot the cover plate 150 closed, the write protect switch must be in the write protect position. Thus, the disk drive will start in the right protect position each time the disk drive is mounted in a computer.

Once the disk drive is mounted on a computer, an operator would then have to take a positive action in order to move the switch actuator into the position illustrated in FIG. 6B, which enables data to be written to the disk drive or deleted from the disk drive. Thus, the switch actuator mechanism illustrated in FIGS. 6A-6C ensures that a disk drive is not accidentally inserted into a computer or a computer server in the write enable mode.

Figure 7:
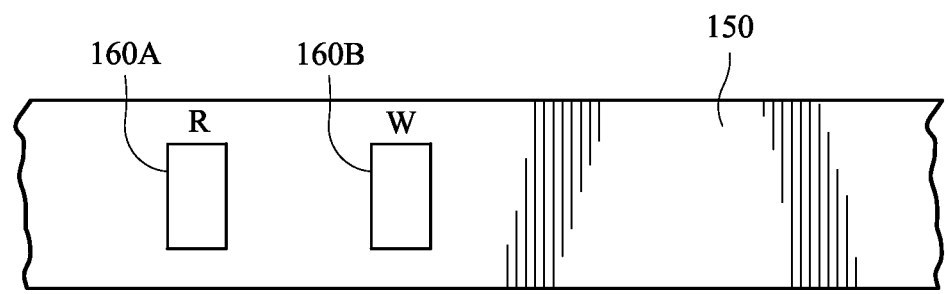
FIG. 7 illustrates a portion of the front face of a cover plate of a disk drive mount with two apertures for a selector switch.

FIG. 7 illustrates another embodiment of the cover plate 150 which include two completely separate apertures that correspond to the write protect and write enable positions of the switch actuator. When the cover plate 150 is closed, the apertures 160A and 160B would hold the switch actuator in one position or the other. For example, if the switch actuator is in the write protect mode, when the cover plate 150 is closed, the switch actuator would protrude from the aperture 160A on the left. So long as the cover plate 150 remains closed, it will be impossible to move the switch actuator to the write enable position. This will prevent any accidental contact from moving the write protect switch into the write enable position.

When a cover plate as illustrated in FIG. 7 is used, it is necessary for an operator to open the cover plate 150 to move the switch actuator from one position to the other. Also, because the switch actuator will always protrude from one aperture or the other, it will be possible for operators to know what position the switch is in by simply looking at the front face of the cover plate 150.

Figure 8:
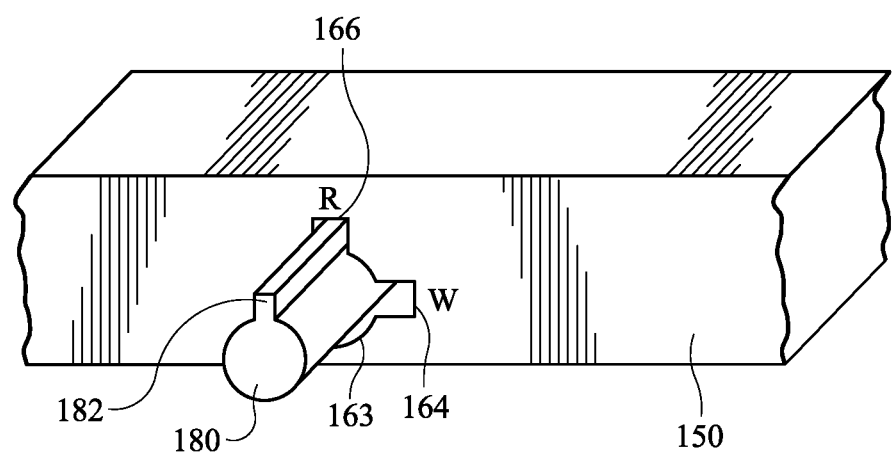
FIG. 8 is a partial front perspective view of a front face of a cover plate is a disk drive mount having a circular selector switch.

FIG. 8 illustrates yet another embodiment of a cover plate 150. In this embodiment, the switch actuator 180 is attached to a rotational switch that is rotated between the write protect and write enable positions. The switch actuator 180 includes a protruding ridge 182. The protruding ridge 182 can be received in either of two apertures 164 or 166 of a hole 163 in the cover plate 150.

In this embodiment, as in the one depicted in FIG. 7, it is necessary to open the cover plate 150 in order to rotate the switch actuator 180 between the write protect and write enable positions. Once the cover plate is closed, the ridge 182 on the switch actuator will be trapped in one of the apertures 164/166, and it will be impossible to rotate the switch actuator to the other position.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A disk drive mount, comprising:
   a mounting body that is configured to be attached to a disk drive, the mounting body including a front face portion, wherein when the mounting body is attached to a disk drive, the front face portion is located adjacent the front of the disk drive;
   a write protect switch located on the front face portion of the mounting body;
   a coupling mechanism that is configured to operatively couple the write protect switch to a disk drive that is attached to the mounting body; and
   a cover plate having a first end that is pivotally attached to a first end of the front face portion such that the cover plate can pivot to cover or expose the front face portion of the mounting body, wherein the cover plate includes a switch actuator aperture, and wherein when the cover plate is pivoted into a closed position in which it covers the front face portion, a switch actuator of the write protect switch extends through the switch actuator aperture in the cover plate.

2. The disk drive mount of claim 1, wherein the coupling mechanism is configured to couple the write protect switch to two jumper pins of a disk drive that is attached to the mounting body.

3. The disk drive mount of claim 1, further comprising a holding mechanism that prevents the switch actuator from moving between a write protect position and a write enable position in the absence of operator intervention.

4. The disk drive mount of claim 1, wherein at least one securing tab extends outward from the first end of the cover plate.

5. The disk drive mount of claim 4, wherein the cover plate is configured such that when the cover plate is pivoted into an open position in which the front face portion of the mounting body is exposed, the at least one securing tab pivots to a position adjacent a side of the mounting body, and wherein then the cover plate is pivoted into a closed position in which it covers the front face portion of the mounting body, the at least one securing tab extends outward from the side of the mounting body.

6. The disk drive mount of claim 1, wherein the switch actuator aperture comprised a slot that includes two detent positions, wherein the switch actuator is biased by a biasing force in a direction that causes the switch actuator to move into the detent positions, and wherein the detent positions and the biasing force act to prevent the switch actuator from moving between a write protect position and a write enable position in the absence of operator intervention.

7. The disk drive mount of claim 6, wherein an operator can move the switch actuator against the biasing force to move the switch actuator out of one of the detent positions and into the other detent position.

8. The disk drive mount of claim 7, wherein a grasping protrusion extends from the switch actuator, and wherein the operator can grasp the grasping protrusion to move the switch actuator from one of the detent positions to the other detent position.

9. The disk drive mount of claim 1, wherein the switch actuator and the switch actuator aperture on the cover plate are configured such that the switch actuator must be located in a write protect position before the cover plate can pivot into the closed position.

10. The disk drive mount of claim 1, wherein a screw hole is located on a second end of the front face portion, wherein the cover plate includes a screw member on a second end of the cover plate, and wherein when the cover plate is pivoted into a closed position in which it covers the front face portion, the screw member can be screwed into the screw hole to keep the cover member in the closed position.

11. The disk drive mount of claim 1, wherein the switch actuator aperture comprises two switch actuator slots, and wherein when the cover plate is pivoted into a closed position in which it covers the front face portion, the switch actuator extends through only one of the two switch actuator slots.

12. The disk drive mount of claim 1, wherein the switch actuator must be rotated to move between a write protect position and a write enable position.

13. The disk drive mount of claim 12, wherein the switch actuator includes a protrusion that extends radially away from a rotational axis of the switch actuator, wherein the switch actuator aperture in the cover plate includes first and second extensions which are located such that when the switch actuator is in the write protect position, the protrusion is received in the first extension and when the switch actuator is located in the write enable position, the protrusion is received in the second extension, and wherein the switch actuator aperture in the cover plate prevents the switch actuator from rotating between the write protect and write enable positions unless the cover plate is moved to an open position at which it exposes the front face portion of the mounting body.

14. The disk drive mount of claim 1, wherein the mounting body comprises a plate that is configured to be attached to a bottom or top surface of a disk drive, wherein the plate includes mounting rails, and wherein when the mounting body is attached to a disk drive, the mounting rails extend outward from the sides of the disk drive.

15. The disk drive mount of claim 1, wherein the mounting body includes side arms that are configured to be attached to sides of a disk drive, and wherein side rails are located on each side arm, the side rails extending outward from the side arms.

16. The disk drive mount of claim 1, wherein the coupling mechanism comprises a jumper that is configured to be mounted on two jumper pins of a disk drive, and electrical wires that couple the jumper to the write protect switch.

17. The disk drive mount of claim 1, wherein the coupling mechanism comprises a connector located on the mounting body, the connector being configured to engage a corresponding backplane connector on a backplane when the disk drive mount is mounted on a mounting assembly of a computer, and electrical wires that couple the connector to the write protect switch.

18. A disk drive mount, comprising:
a mounting body that is configured to be attached to a disk drive, the mounting body including a front face portion, wherein when the mounting body is attached to a disk drive, the front face portion is located adjacent a front of the disk drive;
a write protect switch located on the front face portion of the mounting body and having a switch actuator that extends forward from the front face portion, the switch actuator being movable between a write protect position and a write enable position;
a coupling mechanism that is configured to operatively couple the write protect switch to a disk drive that is attached to the mounting body; and
a cover plate that is movably coupled to the front face portion of the mounting body, the cover plate being movable between an open position that exposes the front face portion of the mounting body and a closed position in which the cover plate covers at least part of the front face portion of the mounting body, wherein the cover plate includes at least one switch actuator aperture, and wherein the at least one switch actuator aperture is configured such that when the cover plate is in the closed position, the switch actuator of the write protect switch is prevented from moving between the write enable and write protect positions.

19. The disk drive mount of claim 18, wherein the at least one switch actuator aperture comprises two switch actuator slots, and wherein when the cover plate is in the closed position the switch actuator extends through only one of the two switch actuator slots.

20. The disk drive mount of claim 18, wherein the switch actuator must be rotated to move between the write protect position and the write enable position, wherein the switch actuator includes a protrusion that extends radially away from a rotational axis of the switch actuator, wherein the at least one switch actuator aperture comprises a single aperture having first and second extensions which are located such that when the switch actuator is in the write protect position, the protrusion is received in the first extension and when the switch actuator is located in the write enable position, the protrusion is received in the second extension, and wherein the switch actuator aperture is configured to prevent the switch actuator from rotating between the write protect and write enable positions unless the cover plate is moved to the open position.

* * * * *